(12) United States Patent
Khare et al.

(10) Patent No.: US 12,047,780 B2
(45) Date of Patent: Jul. 23, 2024

(54) AUTHORIZATION IN CELLULAR COMMUNICATION SYSTEMS

(71) Applicant: Nokia Technologies Oy, Espoo (FI)

(72) Inventors: Saurabh Khare, Bangalore (IN); Chaitanya Aggarwal, Munich (DE); Anja Jerichow, Grafing bei Munich (DE); Gerald Kunzmann, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 369 days.

(21) Appl. No.: 17/568,144

(22) Filed: Jan. 4, 2022

(65) Prior Publication Data
US 2022/0217539 A1   Jul. 7, 2022

(30) Foreign Application Priority Data
Jan. 7, 2021  (FI) ...................................... 20215011

(51) Int. Cl.
*H04W 12/084*  (2021.01)
*H04W 8/18*  (2009.01)
(Continued)

(52) U.S. Cl.
CPC .......... *H04W 12/084* (2021.01); *H04W 8/18* (2013.01); *H04W 12/02* (2013.01); *H04W 12/082* (2021.01); *H04W 12/60* (2021.01)

(58) Field of Classification Search
CPC .................................. H04W 4/24; H04W 8/18
See application file for complete search history.

(56) References Cited

U.S. PATENT DOCUMENTS

| 9,119,080 B2 | 8/2015 | Jactat et al. |
| 9,253,660 B2 | 2/2016 | Bodog |
| 10,555,165 B2 | 2/2020 | Shekhar et al. |
| 10,887,301 B1 | 1/2021 | Vera et al. |

(Continued)

FOREIGN PATENT DOCUMENTS

| WO | 2020/066890 A1 | 4/2020 |
| WO | 2020/141356 A1 | 7/2020 |

(Continued)

OTHER PUBLICATIONS

"3rd Generation Partnership Project; Technical Specification Group Services and System Aspects; Study on enhanced support of Industrial Internet of Things (IIoT) in the 5G System (5GS) (Release 17)", 3GPP TR 23.700-20, V1.3.0, Nov. 2020, pp. 1-88.

(Continued)

*Primary Examiner* — San Htun
(74) *Attorney, Agent, or Firm* — Robert P. Michal, Esq.; Carter, DeLuca & Farrell LLP (57) ABSTRACT

According to an example aspect of the present invention, there is provided an apparatus comprising means for receiving, by a network function configured to provide centralized user consent authorization in a cellular communication system, a user consent authorization request from a logical network entity, wherein the user consent authorization request comprises an identity of at least one user equipment whose user consent is requested by the logical network entity, the logical network entity being a network function service consumer or an application function, means for retrieving user consent information concerning the at least one user equipment whose user consent is requested by the logical network entity, wherein said user consent information indicates individually whether the logical network entity is authorized to access data related to each of the at least one user equipment, means for determining, based on said user consent information, whether the logical network (Continued)

entity is authorized to access data related to each of the at least one user equipment and means for transmitting, based on said determination, a response signed by the network function to the logical network entity.

3 Claims, 6 Drawing Sheets

(51) Int. Cl.
   *H04W 12/02* (2009.01)
   *H04W 12/082* (2021.01)
   *H04W 12/60* (2021.01)

(56) References Cited

U.S. PATENT DOCUMENTS

| | | | |
|---|---|---|---|
| 2015/0074689 | A1 | 3/2015 | Christiansen et al. |
| 2016/0028737 | A1 | 1/2016 | Srinivasan et al. |
| 2016/0226859 | A1* | 8/2016 | Sondhi ............... H04W 12/06 |
| 2019/0392162 | A1* | 12/2019 | Stern ................ G06F 21/6245 |
| 2020/0359218 | A1* | 11/2020 | Lee ..................... H04M 15/50 |
| 2021/0409217 | A1* | 12/2021 | Maley ................ H04L 63/123 |
| 2022/0141662 | A1* | 5/2022 | Liao ................... H04W 12/37 726/1 |

FOREIGN PATENT DOCUMENTS

| | | |
|---|---|---|
| WO | 2020/150268 A1 | 7/2020 |
| WO | 2020/256366 A1 | 12/2020 |

OTHER PUBLICATIONS

"User consent in telecom and 3GPP standardization", Ericsson, Retrieved on Dec. 28, 2021, Webpage available at : https://www.ericsson.com/en/blog/2020/11/5g-privacy-user-consent-3gpp, Best Available Date: Nov. 6, 2020.

Office action received for corresponding Finnish Patent Application No. 20215011, dated May 25, 2021, 12 pages.

"3rd Generation Partnership Project; Technical Specification Group Services and System Aspects; Study on enablers for network automation for the 5G System (5GS); Phase 2 (Release 17)", 3GPP TR 23.700-91, V17.0.0, Dec. 2020, pp. 1 382.

"3rd Generation Partnership Project; Technical Specification Group Core Network and Terminals; 5G System; Network Data Analytics Services; Stage 3 (Release 16)", 3GPP TS 29.520, V16.6.0, Dec. 2020, pp. 1 93.

"3rd Generation Partnership Project; Technical Specification Group Core Network and Terminals; 5G System; Network Function Repository Services; Stage 3 (Release 16)", 3GPP TS 29.510, V16.6.0, Dec. 2020, pp. 1 209.

"3rd Generation Partnership Project; Technical Specification Group Services and System Aspects; Study on User Consent for 3GPP services (Release 17)", 3GPP TR 33.867, V0.2.0, Nov. 2020, pp. 1 11.

Office action received for corresponding Finnish Patent Application No. 20215011, dated Nov. 12, 2021, 13 pages.

Jones et al., "JSON Web Signature (JWS)", RFC 7515, Internet Engineering Task Force (IETF), May 2015, pp. 1-59.

"3rd Generation Partnership Project; Technical Specification Group Services and System Aspects; Security architecture and procedures for 5G system (Release 17)", 3GPP TS 33.501, V17.3.0, Sep. 2021, pp. 1 258.

Extended European Search Report received for corresponding European Patent Application No. 22150266.9, dated May 16, 2022, 9 pages.

"3rd Generation Partnership Project; Technical Specification Group Services and System Aspects; Study on Security Aspects of Enhancement of Support for Edge Computing in 5GC (Release 17)", 3GPP TR 33.839, V0.3.0, Nov. 2020, pp. 1 54.

\* cited by examiner

AUTHORIZATION IN CELLULAR COMMUNICATION SYSTEMS

FIELD

Various example embodiments relate in general to cellular communication systems and more specifically, to authorization in such systems.

BACKGROUND

Privacy regulations may define that user data must not be collected without consent of users. It may be therefore necessary to make sure in various cellular communication systems, such as in 5G systems developed by the 3rd Generation Partnership Project, 3GPP, that a network entity is authorized to access data related to a user equipment. The 3GPP still develops 5G systems and there is a need to provide improved methods, apparatuses and computer programs for authorization in 5G systems. Such improvements may be useful in other cellular communication systems as well in the future.

SUMMARY

According to some aspects, there is provided the subject-matter of the independent claims. Some example embodiments are defined in the dependent claims.

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

According to an aspect of the present invention, there is provided an apparatus, comprising means for receiving, by a network function configured to provide centralized user consent authorization in a cellular communication system, a user consent authorization request from a logical network entity, wherein the user consent authorization request comprises an identity of at least one user equipment whose user consent is requested by the logical network entity, the logical network entity being a network function service consumer or an application function, means for retrieving user consent information concerning the at least one user equipment whose user consent is requested by the logical network entity, wherein said user consent information indicates individually whether the logical network entity is authorized to access data related to each of the at least one user equipment, means for determining, based on said user consent information, whether the logical network entity is authorized to access data related to each of the at least one user equipment and means for transmitting, based on said determination, a response signed by the network function to the logical network entity.

According to an aspect of the present invention, there is provided an apparatus, comprising means for transmitting, to a network function configured to provide centralized user consent authorization in a cellular communication system, a user consent authorization request, wherein the user consent authorization request comprises an identity of at least one user equipment whose user consent is requested by a logical network entity, the logical network entity being a network function service consumer or an application function and means for receiving, responsive to the user consent authorization request, a response signed by the network function.

According to an aspect of the present invention, there is provided an apparatus, comprising means for receiving, by a network repository function, an access token request from a logical network entity, wherein the access token request comprises a success response signed by a network function configured to provide centralized user consent authorization in a cellular communication system and the logical network entity is a network function service consumer or an application function, means for validating the success response signed by the network function and means for transmitting an access token claim signed by the network repository function, the access token claim comprising an identity of at least one user equipment whose data the logical network entity is authorized by the network repository function to collect.

According to an aspect of the present invention, there is provided an apparatus, comprising means for receiving, by a network function producer, an access token claim signed by a network repository function from a logical network entity, the access token claim comprising an identity of at least one user equipment whose data the logical network entity is authorized by the network repository function to collect, means for validating the access token claim and means for transmitting data related to the at least one user equipment whose data the logical network entity is authorized by the network repository function to collect.

According to an aspect of the present invention, there is provided a first method, comprising receiving, by a network function configured to provide centralized user consent authorization in a cellular communication system, a user consent authorization request from a logical network entity, wherein the user consent authorization request comprises an identity of at least one user equipment whose user consent is requested by the logical network entity, the logical network entity being a network function service consumer or an application function, retrieving user consent information concerning the at least one user equipment whose user consent is requested by the logical network entity, wherein said user consent information indicates individually whether the logical network entity is authorized to access data related to each of the at least one user equipment, determining, based on said user consent information, whether the logical network entity is authorized to access data related to each of the at least one user equipment and transmitting, based on said determination, a response signed by the network function to the logical network entity.

According to an aspect of the present invention, there is provided a second method, comprising transmitting, to a network function configured to provide centralized user consent authorization in a cellular communication system, a user consent authorization request, wherein the user consent authorization request comprises an identity of at least one user equipment whose user consent is requested by a logical network entity, the logical network entity being a network function service consumer or an application function and receiving, responsive to the user consent authorization request, a response signed by the network function.

According to an aspect of the present invention, there is provided a third method, comprising receiving, by a network repository function, an access token request from a logical network entity, wherein the access token request comprises a success response signed by a network function configured to provide centralized user consent authorization in a cellular communication system and the logical network entity is a network function service consumer or an application function, validating the success response signed by the network function and transmitting an access token claim signed by the network repository function, the access token claim comprising an identity of at least one user equipment whose data the logical network entity is authorized by the network repository function to collect.

According to an aspect of the present invention, there is provided a fourth method, comprising receiving, by a network function producer, an access token claim signed by a network repository function from a network function service consumer, the access token claim comprising an identity of at least one user equipment whose data the logical network entity is authorized by the network repository function to collect, validating the access token claim and transmitting data related to the at least one user equipment whose data the logical network entity is authorized by the network repository function to collect.

According to an aspect of the present invention, there is provided an apparatus comprising at least one processing core, at least one memory including computer program code, the at least one memory and the computer program code being configured to, with the at least one processing core, cause the apparatus at least to perform, receive, by a network function configured to provide centralized user consent authorization in a cellular communication system, a user consent authorization request from a logical network entity, wherein the user consent authorization request comprises an identity of at least one user equipment whose user consent is requested by the logical network entity, the logical network entity being a network function service consumer or an application function, retrieve user consent information concerning the at least one user equipment whose user consent is requested by the logical network entity, wherein said user consent information indicates individually whether the logical network entity is authorized to access data related to each of the at least one user equipment, determine, based on said user consent information, whether the logical network entity is authorized to access data related to each of the at least one user equipment and transmit, based on said determination, a response signed by the network function to the logical network entity.

According to an aspect of the present invention, there is provided an apparatus comprising at least one processing core, at least one memory including computer program code, the at least one memory and the computer program code being configured to, with the at least one processing core, cause the apparatus at least to perform, transmit, to a network function configured to provide centralized user consent authorization in a cellular communication system, a user consent authorization request, wherein the user consent authorization request comprises an identity of at least one user equipment whose user consent is requested by a logical network entity, the logical network entity being a network function service consumer or an application function and receive, responsive to the user consent authorization request, a response signed by the network function.

According to an aspect of the present invention, there is provided an apparatus comprising at least one processing core, at least one memory including computer program code, the at least one memory and the computer program code being configured to, with the at least one processing core, cause the apparatus at least to perform, receive, by a network repository function, an access token request from a logical network entity, wherein the access token request comprises a success response signed by a network function configured to provide centralized user consent authorization in a cellular communication system and the logical network entity is a network function service consumer or an application function, validate the success response signed by the network function and transmit an access token claim signed by the network repository function, the access token claim comprising an identity of at least one user equipment whose data the logical network entity is authorized by the network repository function to collect.

According to an aspect of the present invention, there is provided an apparatus comprising at least one processing core, at least one memory including computer program code, the at least one memory and the computer program code being configured to, with the at least one processing core, cause the apparatus at least to perform, receive, by a network function producer, an access token claim signed by a network repository function from a logical network entity, the access token claim comprising an identity of at least one user equipment whose data the logical network entity is authorized by the network repository function to collect, validate the access token claim and transmit data related to the at least one user equipment whose data the logical network entity is authorized by the network repository function to collect.

According to an aspect of the present invention, there is provided a non-transitory computer readable medium having stored thereon a set of computer readable instructions that, when executed by at least one processor, cause an apparatus to at least perform the first, second, third or fourth method. According to an aspect of the present invention, there is provided a computer program comprising instructions which, when the program is executed by an apparatus, cause the apparatus to carry out the first, second, third or fourth method.

EXAMPLE EMBODIMENTS

Authorization in cellular communication systems may be improved by the procedures described herein. More specifically, a Network Function, NF, configured to provide centralized user consent authorization in a cellular communication system is provided. The NF is referred to as a User Consent Authorization, UCA, NF. A logical network entity, such as a NF service consumer, NFc, or an Application Function, AF, may request user consent from the UCA NF and the UCA NF may then determine, based on retrieved user consent information, an identity of at least one User Equipment, UE, whose data the logical network entity is authorized by the UCA NF to access. Said user consent information may comprise Boolean flags (true/false) indicating individually for each of the at least one UE whether the logical network entity is authorized to access data. The UCA NF may transmit a signed success response comprising the identity of the at least one UE whose data the logical network entity is authorized by the UCA NF to access. The logical network entity may then use the signed success response to request an access token from a Network Repository Function, NRF. The logical network entity may further use the received token to request a service from an NF service producer, NFp, and access data related to UEs.

Embodiments of the present invention address at least the following challenges. First of all, if user consent information is stored in a database which stores subscription information of UEs, such as a Unified Data Manager, UDM, or a Unified Data Repository, UDR, all logical network entities which want to access data related to a UE may need to retrieve a permission, i.e., a consent flag, from the database before they can access data related to the UE. Data related to the UE in general refers to any data from the UE, about the UE or about a user of the UE. That is to say, data related to the UE also cover indirect data related to the user which may also be subject to user consent. Upon receiving the permission, the logical entities may collect data from the UE, whose consent has been confirmed, and/or the data may be collected from other NFs. However, all logical network entities may not contact the database which stores subscription information of UEs before collecting said data related to the UE. In some embodiments of the present invention, each NF collecting the data related to the UE must contact the UCA NF for authorization. Therefore, contacting the UDM is not required as the UCA NF caches the UDM data locally.

For example, an AF may not interact with the database which stores subscription information of UEs before collecting the data of the UE. Moreover, even if the AF would interact with the database which stores subscription information of UEs to get a consent of a user of the UE, the AF may anyway collect data via an AMF. The AMF would therefore also need to coordinate with the database which stores subscription information of UEs before collecting the data related to the UE from the UE or from other NFs. Consequently, the same consent checking process would need to be performed by the AF and the AMF, thereby causing extra signaling and delay. In some embodiments of the present invention, each logical network entity, such as an AF or NF, holding the data related to the UE must contact the UCA NF so that the revocation can be performed later on.

A second challenge addressed by some embodiments of the present invention is that when a user or an operator changes the user consent setting and requests to delete the data related to the UE that is no longer covered by the new user consent settings, then all logical network entities must delete said data. Deletion of said data is possible only when all logical network entities, which store said data related to the UE can learn about the modification/revocation of the user consent. This may be achieved when said logical network entities have subscribed in the database to collect notifications about changes in user consent information of the user, i.e., to collect notifications about changes in user consent information concerning the UE. However, this requires all logical network entities storing said data need to subscribe to the database (UDM/UDR) and maintain the subscription as long as said logical entities hold said data, thereby causing extra load on the UDM/UDR to maintain such subscriptions. The user consent information concerning the UE refers to the consent of the user, as the UE in question is the UE of the user.

As an example, if a user of a UE has given consent to a logical network entity to collect data related to the UE, the logical network entity may collect the data related to the UE from the UE or from other NFs. The logical network entity may then store the data related to the UE, e.g., for one year. Storage duration may depend on operator policies and/or configurations related to the use case, but in any case the logical network entity may need to subscribe to the database which stores subscription information of UEs, e.g., for the one-year duration to collect notifications about changes in user consent information concerning the UE. Without subscription, the database which stores subscription information of UEs would not send said notifications about changes in user consent information concerning the UE. Keeping of such longer subscriptions would be a tedious job for both, the logical network entity and the database which stores subscription information of UEs. Keeping of such longer subscriptions would also unnecessarily increase the signaling in the network. Improvements are therefore required to avoid these issues. In some embodiments of the present invention, the UCA NF may thus store historical information about NFs which collect the data related to the UE, as such NFs must have record in the UCA NF. Therefore, a subscription with the UCA NF is not required It is also noted that different regulatory bodies, at least European, have published guidelines like General Data Protection Regulation, GDPR, related to user consent. According to those guidelines, in order to respect consent of the user, the logical network entity, like a NFc or AF, needs to delete the data related to the UE when consent of a user of the UE is revoked, e.g., if intended purpose for processing the data is no longer given, e.g., a mobile phone contract has been terminated.

Another challenge with the approach, wherein the database which stores subscription information of UEs is used for authorization of user consent, is that there would be no central entity that keeps track of which logical network entities have been collecting the data related to the UE. If the database which stores subscription information of UEs is used for storing said user content information, tracking of all logical network entities and asking all of them to delete said user consent information whenever user consent is revoked, would be nearly impossible, and would require significant signalling. In addition, there is a need to provide authorization at least in 5G core networks to allow, or disallow, logical network entities to collect the data related to the UE. In some embodiments of the present invention, the subscription/notification may be done between the UCA NF and the database. Thus, each NF/AF does not have to create millions of subscription/notification with the database (UDM/UDR) like if 100 AF/NF would be creating 100 subscriptions at the UDM to collect notification of consent change for a given UE/user.

Embodiments of the present invention therefore provide the UCA NF, which is configured to provide centralized user consent authorization in a cellular communication system, such as in a 5G system or some other cellular communication system wherein NFs are used. If a logical network entity, such as a NF or AF, wants to retrieve said data related to the UE, the logical network entity must get an authorization via the UCA NF.

The logical network entity may request consent of a user of at least one UE by transmitting a user consent authorization request to the UCA NF. Upon receiving the user consent authorization request, the UCA NF may retrieve, from the database which stores subscription information of UEs, user consent information concerning the at least one UE, wherein said user consent information indicates whether the logical network entity is authorized to access data related to each of the at least one UE. If said user consent information indicates that the logical network entity is authorized to access data related to the UE, the UCA NF may sign a success response and transmit the success response to the logical network entity, the success response comprising an identity of at least one UE whose data the logical network entity is authorized by the UCA NF to access. The at least one UE whose data the logical network entity is authorized by the UCA NF to access may be one of the at least one UE whose consent is requested by the logical network entity. If consent of users of multiple UEs is requested and authorized by the UCA NF, the success response may comprise a list of identities of UEs whose data the logical network entity is authorized by the UCA NF to access. In general, consent of a UE refers to a consent of a user of the UE.

The logical network entity may further use the success response signed by the UCA NF to get an authorization from an NRF as well. The logical network entity may transmit an access token request to the NRF, the access token request comprising the signed success response received from the UCA NF. If the NRF authorizes the logical network entity, the NRF may transmit to the logical entity an access token comprising an identity of at least one UE whose data the logical network entity is authorized by the NRF to collect. The at least one UE whose data the logical network entity is authorized by the NRF to collect may be one of the at least one user equipment whose data the logical network entity is authorized by the UCA NF to access.

The logical network entity may then transmit to a NFp a service request comprising an identity of the at least one UE whose data the logical network entity is authorized by the NRF to collect, and the NFp may validate the at least one UE and transmit data related to the at least one UE to the logical network entity.

It is therefore ensured that all logical network entities storing data related to the at least one UE can be tracked centrally by the UCA NF and multiple NFs do not need to individually check the user consent information, as it is checked by the UCA NF.

Some embodiments also enable revocation of user consent of UEs. The UCA NF may store information, e.g., to a memory or persistent storage of an apparatus comprising the UCA NF, about logical network entities which have been authorized by the UCA NF to access data related to a UE. If user consent of the UE is then revoked, the UCA NF may retrieve from the memory identities of said logical network entities and request said logical network entities to delete the data related to the UE.

Figure 1:
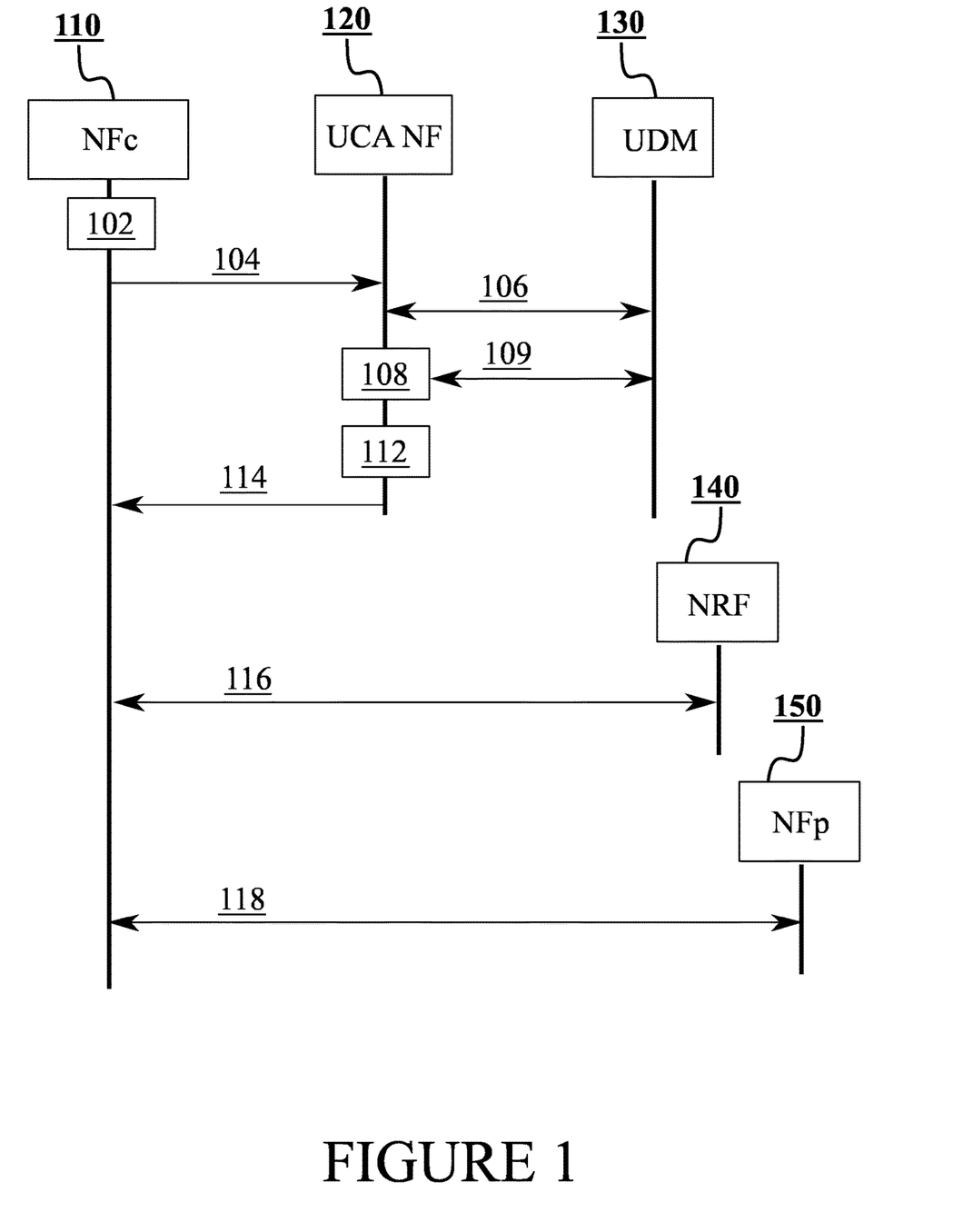
FIG. 1 illustrates a first signalling graph in accordance with at least some example embodiments.

FIG. 1 illustrates a first signalling graph in accordance with at least some example embodiments. On the vertical axes are disposed, from the left to the right, NFc 110, UCA NF 120, UDM 130, NRF 140 and NFp 150. Time advances from the top towards the bottom.

In the first signalling example UCA NF 120 is a standalone NF but in general UCA NF 120 may be a part of, hosted by or co-located with, any other NF except NFc 110. Moreover, even though NFc 110 is used as an example of a logical network entity in the first signalling graph, steps of NFc 110 may be performed by any logical network entity, such as an AF, in general. Similarly, even though UDM 130 is used as an example of a database which stores subscription information of UEs, any such database may perform the same steps as UDM 130 in this example embodiment.

At step 102, NFc 110 may determine that it wants to collect data related to at least one UE (not shown in FIG. 1), for example depending on a use case of NFc 110. For example, if NFc 110 is an NWDAF NF, it may need to collect data related to at least one UE for analytics.

At step 104, NFc 110 may discover UCA NF 120 and transmit a user consent authorization request to UCA NF 120. The user consent authorization request may comprise at least one of the following:
- a callback URI of NFc 110 so that UCA NF 120 can respond to NFc 110 and also contact NFc 110 later on, e.g., to request deletion of data related to a UE if consent of a user of the UE has been revoked;
- an identity of NFc 110, such as an instance or set identity, so that UCA NF 120 can respond to NFc 110 and also contact NFc 110 later on, e.g., to request deletion of data related to the UE if consent of the user of the UE has been revoked;
- an identity of at least one UE whose consent is requested by NFc 110; or
- an indication related to a storage capacity of NFc 110, e.g., an indication about storage capacity of NFc 110:
  Value=0: NFc 110 does not have persistent storage capability and neither they store the data in the memory, i.e., in such a case said indication indicates that NFc 110 does not have storage capacity at all, at least not available at the moment of the user consent authorization request;
  Value≠0: NFc 110 requests to store the data related to the UE for a certain maximum duration, such as 6 months, 1 year, etc. In such a case, said indication indicates that NFc 110 requests a permission to store data related to said user equipment for a certain time interval;

At step 106, UCA NF 120 may retrieve from UDM 130, by transmitting a request and receiving a response, said user consent information concerning the at least one UE, wherein said user consent information indicates individually whether NFc 110 is authorized to access data related to each of the at least one UE whose consent is requested by NFc 110. Alternatively, UCA NF 120 may retrieve, at step 106, said user consent information concerning the at least one UE, for example from a memory of an apparatus comprising UCA NF 120 if said user consent information concerning the at least one UE has been stored into the memory of the apparatus.

At step 108, UCA NF 120 may store said user consent information concerning the at least one UE, for example to a memory of an apparatus comprising UCA NF 120, if said user consent information concerning the at least one UE has not been stored before. At step 109, UCA NF 120 may transmit a subscription request to UDM 130, to request notifications about changes in said user consent information concerning the at least one UE whose data the logical network entity is authorized by UCA NF 120 to access. UDM 130 may then accept the subscription request. Steps 108 and 109 may, or may not, happen in parallel.

Alternatively, at step 109, UCA NF 120 may transmit a subscription request to UDM 130, to request notifications about changes in said user consent information concerning any UE, range of UEs, or a group of UEs, which may be accepted by UDM 130 as well. UCA NF 120 may for example transmit a subscription request to UDM 130, the subscription request identifying UE=Any UE/Range of UE/Group of UE, Consent Change=True. Based on this subscription, UDM 130 may transmit notifications to UCA NF 120 whenever consent of any UE, said range of UEs or said group if UEs is changed. Optimized subscription request for a group would reduce the load of UCA NF 120 and UDM 130, as UCA NF 120 does not need to transmit a subscription request for each individual UE and UDM 130 does not need to transmit notifications for all UEs. The at least one UE whose data NFc 110 is authorized by UCA NF 120 to access may belong to this group.

At step 112, UCA NF 120 may determine, based on said user consent information concerning the at least one UE whose consent is requested by NFc 110, at least one UE whose data the logical network entity is authorized by UCA NF 120 to access. That is to say, UCA NF 120 may check individually whether each UE, whose consent has been requested by NFc 110, has approved the collection of data by NFc 110.

UCA NF 120, at step 112, may apply operator policy along with said user consent information received from UDM 130. For example, if the operator wants to define the policy to restrict or overwrite the user consent based on NFc 110 details, it can be applied at this step i.e. user has given the consent to collect the data but based on policy, the one of the consumer network function is not allowed to collect the data whereas other network function is allowed to collect data. If NFc 110 is not authorized to access data related to any of the request UE(s), UCA NF 120 can reject the request with an error code. In some embodiments, step 112 may be performed before step 106 and in such a case steps 106 to 109 would not be needed.

UCA NF 120 may store, at step 112, an identity and other details of NFc 110, for example to a memory of an apparatus comprising UCA NF 120. For instance, if NFc 110 is authorized to collect data related to the at least one UE, and going to store the data for, e.g., 6 months, UCA NF 120 may store such information to be used in case of possible revocation of user consent of the at least one UE.

At step 114, UCA NF 120 may transmit a success response signed by UCA NF 120 to NFc 110, the success response further comprising an identity of the at least one UE whose data NFc 110 is authorized by UCA NF 120 to access. UCA NF 120 may have either a private/public key pair or digital certificates, which enable signing of messages transmitted by UCA NF 120 to NFc 110, such as success responses and requests to delete data related to UEs. NFc 110 may either be configured with a corresponding public key or use digital certificates in Public Key Infrastructure, PKI, in order to verify the signature of UCA NF 120, thus ensuring that the content of a success response or a request to delete data is not tampered. In addition to the identity of the at least one UE whose data NFc 110 is authorized by UCA NF 120 to access, the success response may comprise an identity of NFc 110 and/or an identity of UCA NF 120.

At step 116, NFc 110 may transmit an access token request to NRF 140, wherein the access token request comprises the success response signed by UCA NF 120. NFc 110 may transmit the access token request to NRF 140 to get an access token claim, which can be used to retrieve data from NFp 110. Access Token Application Programming Interfaces, APIs, of the access token request may be enhanced to have an element "UCA NF Signed details" which includes the contents of success response received from UCA NF 120 at step 114.

Upon receiving the access token request, NRF 140 may determine, an identity of at least one UE whose data NFc 110 is authorized by NRF 140 to collect. The at least one UE whose data NFc 110 is authorized by NRF 140 to collect may be one of the at least one UE whose data NFc 110 is authorized by UCA NF 120 to access. That is to say, UCA NF 120 may check individually whether NFc 110 has a right, e.g., based on a profile of NFc 110, to access data related to each UE authorized by UCA NF 120.

NRF 140 may then transmit, responsive to the access token request, an access token claim comprising the identity of the at least one UE whose data NFc 110 is authorized by NRF 140 to collect. Moreover, in some embodiments, NRF 140 may validate UCA NF 120 (i.e. its signature), using the public key of UCA NF 120 configured in NRF 140 during the NF registration.

At step 118, NFc 110 may transmit a service request to NFp 150 to retrieve data related to the at least one UE whose data NFc 110 is authorized by NRF 140 to collect, wherein the service request may comprise the access token. NFp 150 may validate the service request if service request UE identity and token UE identities are matched. Upon successful validation, NFp 150 may provide data related to the UE to NFc 110. Otherwise, NFp 110 must reject the service request. In this way, NFp 150 can ensure NFc 110 that data is provided only for NFcs which have been authorized to collect data from certain UEs, but not for other NFcs.

Figure 2:
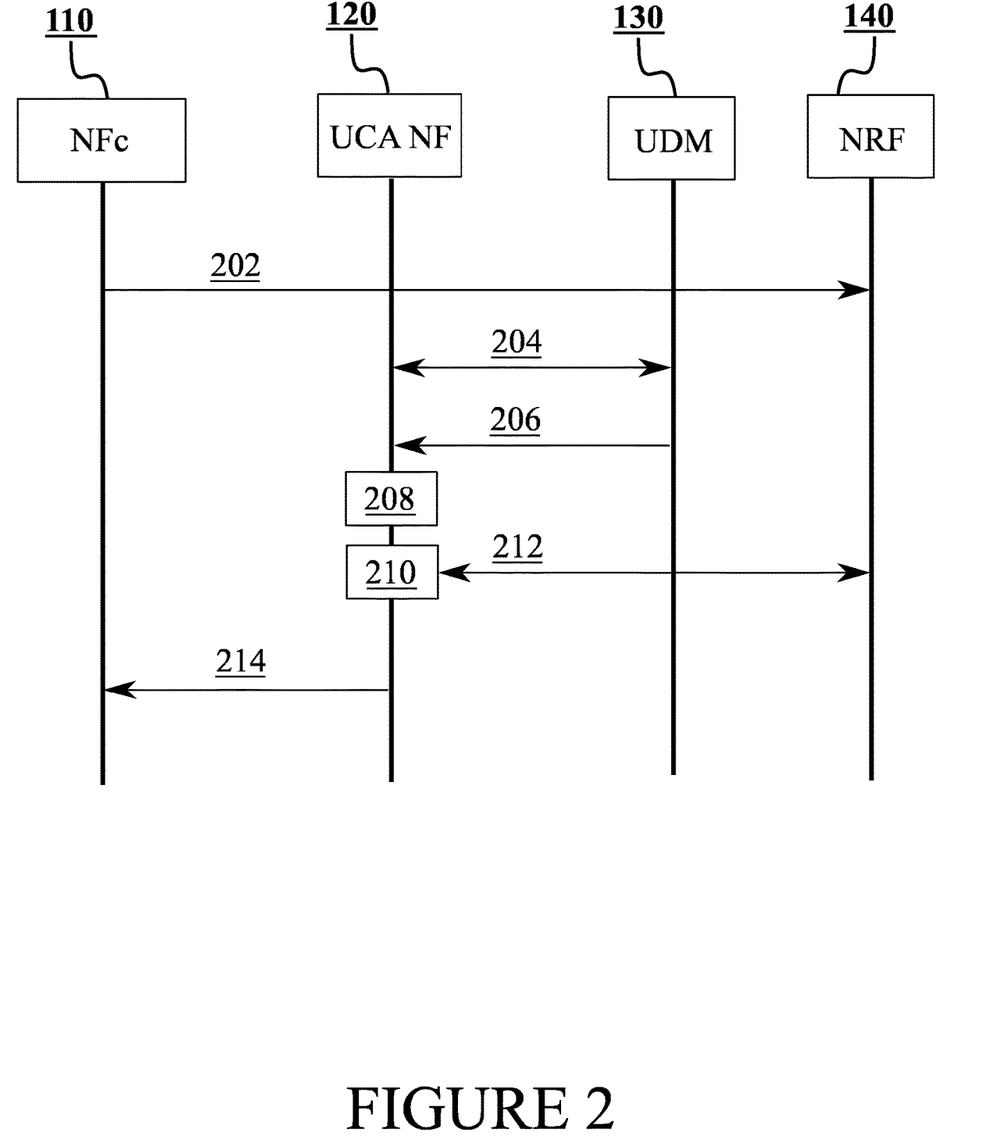
FIG. 2 illustrates a second signalling graph in accordance with at least some example embodiments.

FIG. 2 illustrates a second signalling graph in accordance with at least some example embodiments. On the vertical axes are disposed, from the left to the right, NFc 110, UCA NF 120, UDM 130 and NRF 140. Time advances from the top towards the bottom. In the second signalling example UCA NF 120 is also a stand-alone NF but in general UCA NF 120 may be a part of, or hosted by, any other NF except NFc 110. Moreover, even though NFc 110 is used as an example of a logical network entity in the second signalling graph as well, steps of NFc 110 may be performed by any logical network entity, such as an AF, in general. Similarly, even though UDM 130 is used as an example of a database which stores subscription information of UEs, any such database may perform the same steps as UDM 130 in this example.

At step 202, NFc 110 which has storage capacity, may transmit a registration request to NRF 140 having deletion of data if user consent of a UE has changed. For instance, NFc 110 may register to NRF 140 with DefaultCallBackForDataRemoval:URI. Said callback URI may be forwarded to UCA NF 120 by NRF 140 and used by UCA NF 120 to trigger a notification for deletion of stored data whenever consent of the user of the UE is revoked.

At step 204, UCA NF 120 may perform individual subscription process similarly as at step 109 of FIG. 1 for one UE for a group of UEs or for all UEs, so that UDM 130 can inform UCA NF 120 when user consent of at least one UE is changed. At step 206, when user consent of at least one UE is revoked, UDM 130 may inform UCA NF 120 accordingly. That is, UDM 130 may transmit to UCA NF 120 a notification about revocation of user consent of a UE if UCA NF 120 has subscribed to such a notification from UDM 130 at step 202.

At step 208, UCA NF 120 may determine that NFc 110 has stored data related to the UE based on previous received registration/authorization request from NFc 110. For instance, based on historical/tracked data and validity of the expiry of stored data in NFc 110, UCA NF 120 may determine at least one NF which is still storing the data related to the UE. At step 210, UCA NF 120 may determine that it needs to discover NFc 110 which is still storing the data related to the UE. For example, if an address of NFc 110 is not available in the historical/tracked data or the known address is outdated, UCA NF 120 may perform a discovery of NFc 110 based on stored information, such as instance identity or set identity of NFc 110, and retrieve the Callback URI address as DefaultCallBackForDataRemoval from NRF 140 at step 212.

At step 214, UCA NF 120 may then transmit a request to delete the data related to the UE to NFc 110. When the request to delete the data is received, NFc 110 must delete the data related to the UE, for example from a memory of the apparatus comprising NFc 110.

Figure 3:
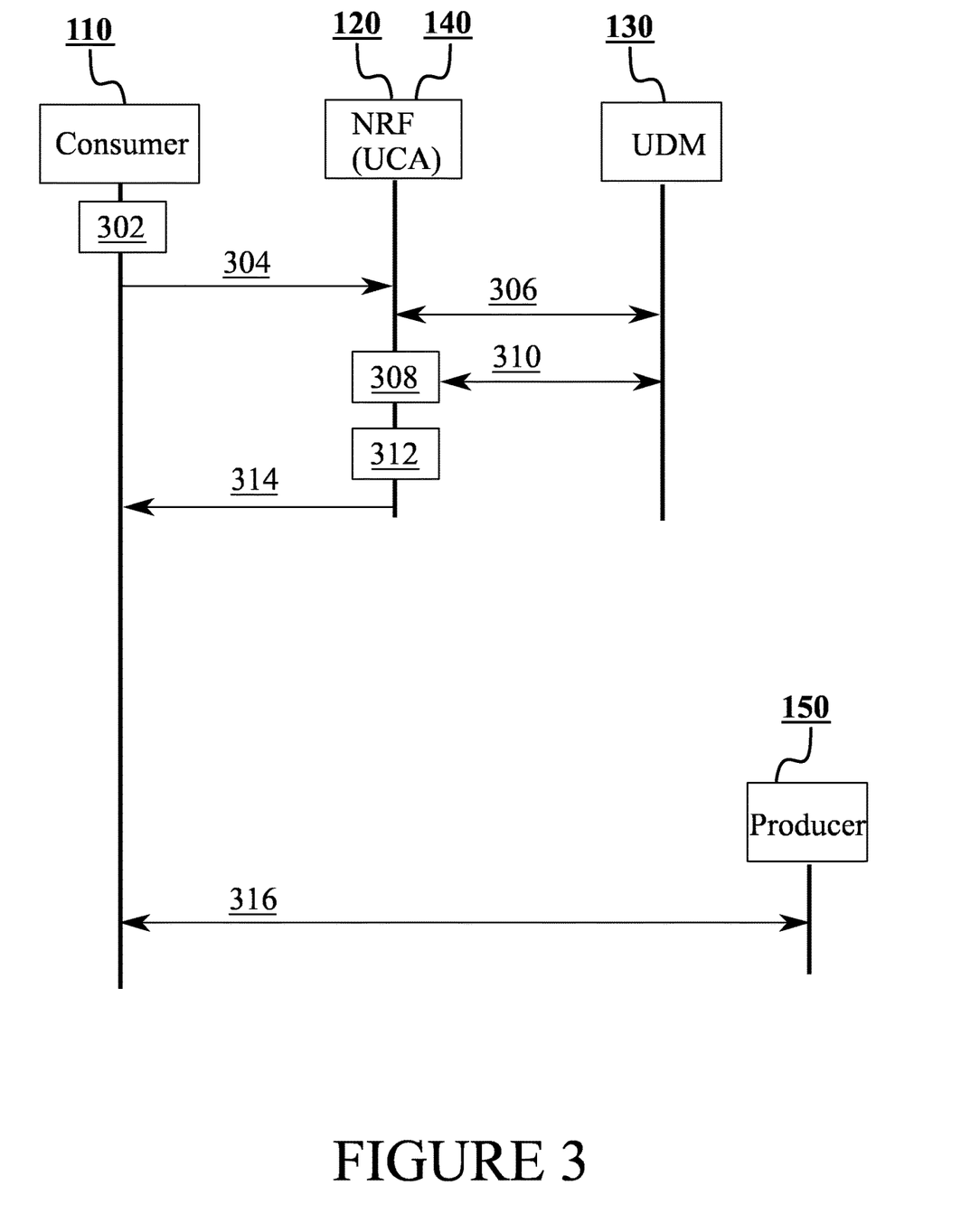
FIG. 3 illustrates a third signalling graph in accordance with at least some example embodiments.

FIG. 3 illustrates a third signalling graph in accordance with at least some example embodiments. The third signalling graph shown in FIG. 3 demonstrates a scenario wherein UCA NF 120 is implemented in NRF 140 as a new service or new functionality in existing service(s). Thus, step 116 of FIG. 1 is not needed in the example of FIG. 3 and UCA NF 120 may transmit, at step 314, an access token claim comprising an identity of the at least one UE whose data NFc 110 is authorized by NRF 140 to collect, instead of transmitting an identity of the at least one UE whose data NFc 110 is authorized by UCA NF 120 to collect like at step 114 of FIG. 1. Unnecessary signalling can be therefore avoided. Otherwise the process shown in the third signalling graph is the same as in case of the first signalling graph.

In some embodiments, UCA NF 120 may be implemented in UDM 130 as a new service or new functionality in existing service(s). In such a case, UCA NF 120 may retrieve said user consent information from a memory and there is no need to retrieve said user consent information from UDM 130, i.e., additional hop 106 between UDM 130 and UCA NF 120 can be avoided to reduce unnecessary signalling. More generally, UCA NF 120 may anyway be a part of, or hosted by, any NF, AF or a proxy as a new service or new functionality in the existing services.

Figure 4:
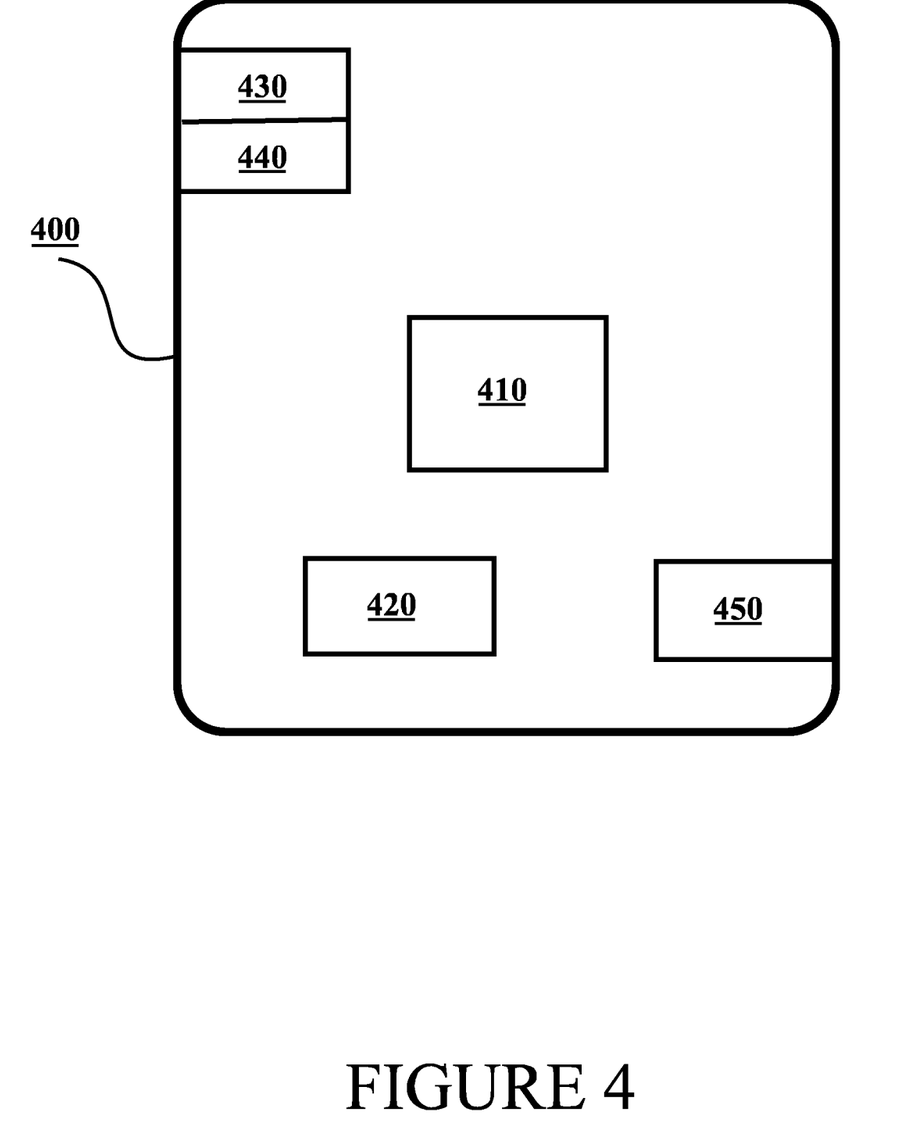
FIG. 4 illustrates an example apparatus capable of supporting at least some example embodiments.

FIG. 4 illustrates an example apparatus capable of supporting at least some example embodiments. Illustrated is device 400, which may comprise, for example, NFc 110 or UCA NF 120, or a device controlling functioning thereof. Comprised in device 400 is processor 410, which may comprise, for example, a single- or multi-core processor wherein a single-core processor comprises one processing core and a multi-core processor comprises more than one processing core. Processor 410 may comprise, in general, a control device. Processor 410 may comprise more than one processor. Processor 410 may be a control device. Processor 410 may comprise at least one Application-Specific Integrated Circuit, ASIC. Processor 410 may comprise at least one Field-Programmable Gate Array, FPGA. Processor 410 may comprise an Intel Xeon processor for example. Processor 410 may be means for performing method steps in device 400, such as determining, causing transmitting and causing receiving. Processor 410 may be configured, at least in part by computer instructions, to perform actions. For instance, processor 410 may be configured to determine, based on said user consent information, the at least one UE whose data the logical network entity is authorized by UCA NF 120 to access or to perform any other determination step.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a network function, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 400 may comprise memory 420. Memory 420 may comprise random-access memory and/or permanent memory. Memory 420 may comprise at least one RAM chip. Memory 420 may comprise solid-state, magnetic, optical and/or holographic memory, for example. Memory 420 may be at least in part accessible to processor 410. Memory 420 may be at least in part comprised in processor 410. Memory 420 may be means for storing information. Memory 420 may comprise computer instructions that processor 410 is configured to execute. When computer instructions configured to cause processor 410 to perform certain actions are stored in memory 420, and device 400 overall is configured to run under the direction of processor 410 using computer instructions from memory 420, processor 410 and/or its at least one processing core may be considered to be configured to perform said certain actions. Memory 420 may be at least in part comprised in processor 410. Memory 420 may be at least in part external to device 400 but accessible to device 400.

Device 400 may comprise a transmitter 430. Device 400 may comprise a receiver 440. Transmitter 430 and receiver 440 may be configured to transmit and receive, respectively, information in accordance with at least one cellular standard, such as a standard defined by the 3GPP. Transmitter 430 may comprise more than one transmitter. Receiver 440 may comprise more than one receiver. Transmitter 430 and/or receiver 440 may be configured to operate in accordance with a suitable communication standard.

For instance, transmitter 430 may be configured to transmit the success response or perform any other transmitting step. Similarly, receiver 440 may be configured for example to receive the user consent authorization request or perform any other receiving step. Transmitter 430 and receiver 440 may be configured together to retrieve said user consent information or perform any other retrieving step.

Device 400 may comprise User Interface, UI, 450. UI 450 may comprise at least one of a display, a keyboard, a touchscreen, a vibrator arranged to signal to a user by causing device 400 to vibrate, a speaker or a microphone. A user may be able to operate device 400 via UI 450, for example to configure device 400 and/or functions it runs.

Processor 410 may be furnished with a transmitter arranged to output information from processor 410, via electrical leads internal to device 400, to other devices comprised in device 400. Such a transmitter may comprise a serial bus transmitter arranged to, for example, output information via at least one electrical lead to memory 420 for storage therein. Alternatively to a serial bus, the transmitter may comprise a parallel bus transmitter. Likewise processor 410 may comprise a receiver arranged to receive information in processor 410, via electrical leads internal to device 400, from other devices comprised in device 400. Such a receiver may comprise a serial bus receiver arranged to, for example, receive information via at least one electrical lead from receiver 440 for processing in processor 410. Alternatively to a serial bus, the receiver may comprise a parallel bus receiver.

Device 400 may comprise further devices not illustrated in FIG. 4. In some example embodiments, device 400 lacks at least one device described above. For example, device 400 may not have UI 450.

Processor 410, memory 420, transmitter 430, receiver 440 and/or UI 450 may be interconnected by electrical leads internal to device 400 in a multitude of different ways. For example, each of the aforementioned devices may be separately connected to a master bus internal to device 400, to allow for the devices to exchange information. However, as the skilled person will appreciate, this is only one example and depending on the example embodiment various ways of interconnecting at least two of the aforementioned devices may be selected without departing from the scope of the present invention.

Figure 5:
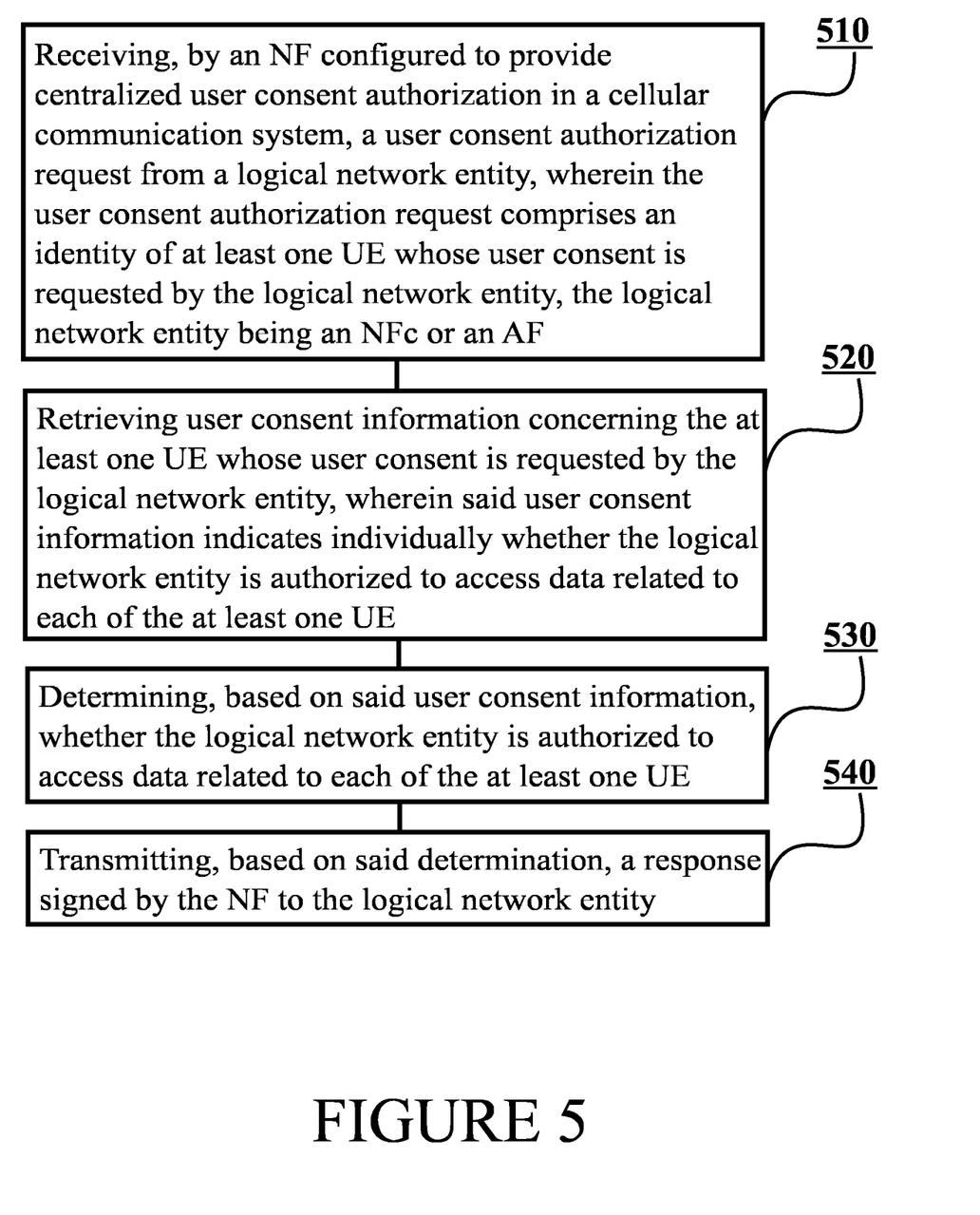
FIG. 5 illustrates a flow graph of a first method in accordance with at least some example embodiments.

FIG. 5 is a flow graph of a first method in accordance with at least some example embodiments. The phases of the illustrated first method may be performed by UCA NF 120.

The first method may comprise, at step 510, receiving, by a network function configured to provide centralized user consent authorization in a cellular communication system, a user consent authorization request from a logical network entity, wherein the user consent authorization request comprises an identity of at least one user equipment whose user consent is requested by the logical network entity, the logical network entity being a network function service consumer or an application function. The first method may also comprise, at step 520, retrieving user consent information concerning the at least one user equipment whose user consent is requested by the logical network entity, wherein said user consent information indicates individually whether the logical network entity is authorized to access data related to each of the at least one user equipment. Moreover, the first method may comprise, at step 530, determining, based on said user consent information, whether the logical network entity is authorized to access data related to each of the at least one user equipment. Finally, the first method may comprise, at step 540, transmitting, based on said determination, a response signed by the network function to the logical network entity.

Figure 6:
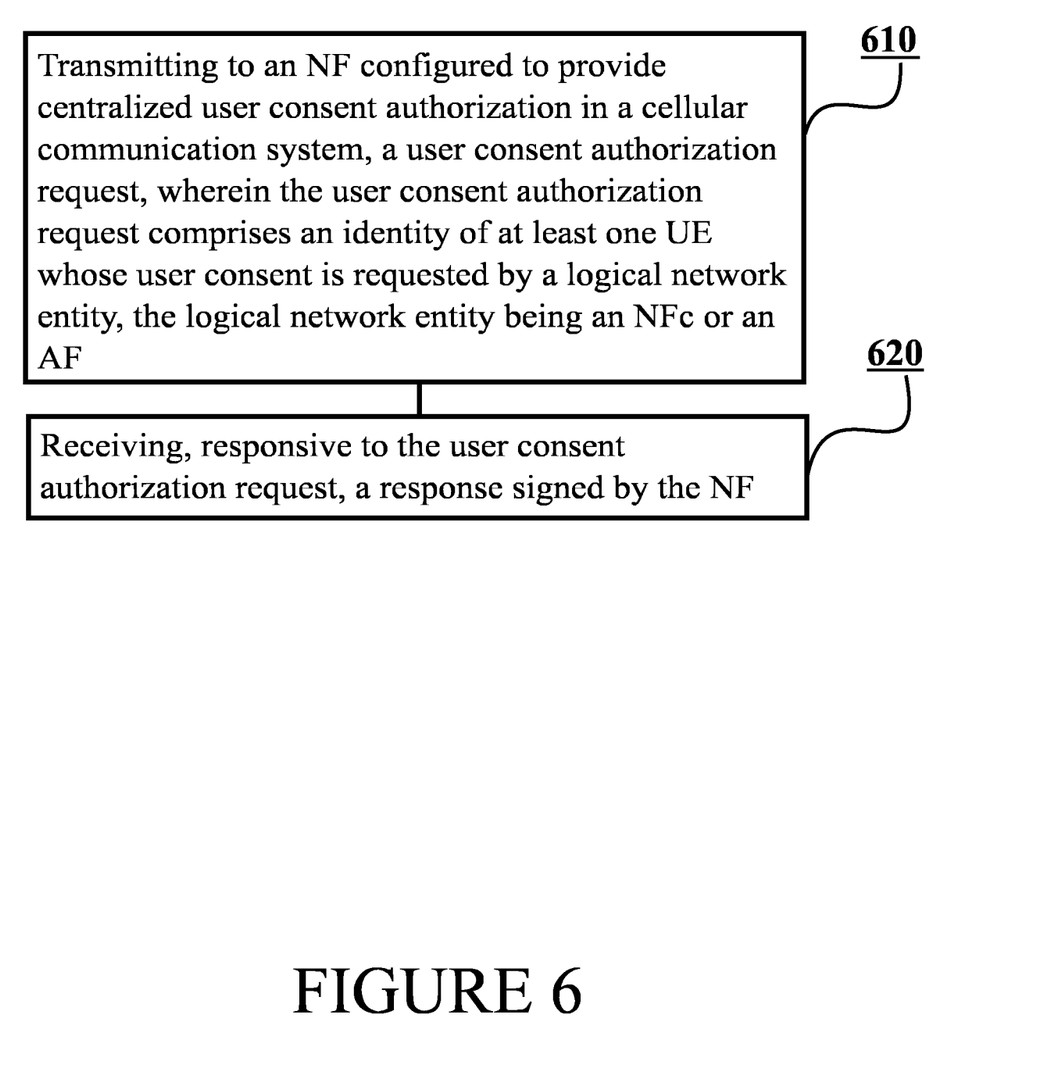
FIG. 6 illustrates a flow graph of a second method in accordance with at least some example embodiments.

FIG. 6 is a flow graph of a second method in accordance with at least some example embodiments. The phases of the illustrated second method may be performed by a logical network entity such as NFc 110 or an AF.

The second method may comprise, at step 610, transmitting, to a network function configured to provide centralized user consent authorization in a cellular communication system, a user consent authorization request, wherein the user consent authorization request comprises an identity of at least one user equipment whose user consent is requested by a logical network entity, the logical network entity being a network function service consumer or an application function. The second method may also comprise, at step 620, receiving, responsive to the user consent authorization request, a response signed by the network function.

It is to be understood that the example embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular example embodiments only and is not intended to be limiting.

Reference throughout this specification to one example embodiment or an example embodiment means that a particular feature, structure, or characteristic described in connection with the example embodiment is included in at least one example embodiment. Thus, appearances of the phrases "in one example embodiment" or "in an example embodiment" in various places throughout this specification are not necessarily all referring to the same example embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various example embodiments and examples may be referred to herein along with alternatives for the various components thereof. It is understood that such example embodiments, examples, and alternatives are not to be construed as de facto equivalents of one another, but are to be considered as separate and autonomous representations.

In an example embodiment, an apparatus, comprising for example NFc 110 or UCA NF 120, may further comprise means for carrying out the example embodiments described above and any combination thereof.

In an example embodiment, a computer program may be configured to cause a method in accordance with the example embodiments described above and any combination thereof. In an exemplary example embodiment, a computer program product, embodied on a non-transitory computer readable medium, may be configured to control a processor to perform a process comprising the example embodiments described above and any combination thereof.

In an example embodiment, an apparatus, comprising for example NFc 110 or UCA NF 120, may further comprise at least one processor, and at least one memory including computer program code, wherein the at least one memory and the computer program code are configured to, with the at least one processor, cause the apparatus at least to perform the example embodiments described above and any combination thereof.

Furthermore, the described features, structures, or characteristics may be combined in any suitable manner in one or more example embodiments. In the preceding description, numerous specific details are provided, such as examples of lengths, widths, shapes, etc., to provide a thorough understanding of example embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the example embodiments in one or more particular applications, it will be apparent to those of ordinary skill in the art that numerous modifications in form, usage and details of implementation may be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

The expression "at least one of A or B" in this document means A, or B, or both A and B.

INDUSTRIAL APPLICABILITY

At least some example embodiments find industrial application in cellular communication systems, such as 5G systems, and possibly in other cellular communication systems in the future wherein it is desirable to provide authorization of user consent of a user equipment.

ACRONYMS LIST

3GPP 3$^{rd}$ Generation Partnership Project
5GS 5G System
AF Application Function
AMF Access and Mobility management Function
API Application Programming Interface
NF Network Function
NFc Network Function Service Consumer
NFp Network Function Service Producer
NRF Network Repository Function
NWDAF Network Data Analytics Function
PKI Public Key Infrastructure
SMF Session Management Function
UCA User Consent Authorization
UDM Unified Data Manager
UDR Unified Data Repository
UE User Equipment

REFERENCE SIGNS LIST

| | |
|---|---|
| 102-109, 112-118 | Steps in FIG. 1 |
| 110 | NFc |
| 120 | UCA NF |
| 130 | UDM |
| 140 | NRF |
| 150 | NFp |
| 202-214 | Steps in FIG. 2 |
| 302-316 | Steps in FIG. 3 |
| 400-450 | Structure of the apparatus of FIG. 4 |
| 510-540 | Phases of the method in FIG. 5 |
| 610-620 | Phases of the method in FIG. 6 |

The invention claimed is:

1. An apparatus comprising at least one processor; and at least one memory including computer program code; the at least one memory and the computer program code configured to, with the at least one processor, cause the apparatus at least to:

receive, by a network function configured to provide centralized user consent authorization in a cellular communication system, a user consent authorization request from a logical network entity, wherein the user consent authorization request comprises an identity of at least one user equipment whose user consent is requested by the logical network entity, the logical network entity being a network function service consumer or an application function;

retrieve user consent information concerning the at least one user equipment whose user consent is requested by the logical network entity, wherein said user consent information indicates individually whether the logical network entity is authorized to access data related to each of the at least one user equipment, wherein the user consent authorization request comprises an indication about a storage capacity of the logical network entity, wherein the user consent information includes a consent flag, wherein the indication indicates that the logical network entity requests a permission to store data related to the at least one user equipment whose data the logical network entity is authorized by the network function to access for a certain time interval;

determine, based on said user consent information, whether the logical network entity is authorized to access data related to each of the at least one user equipment;

transmit, based on said determination, a response signed by the network function to the logical network entity;

transmit, upon receiving the user consent authorization request, a subscription request to a database which stores subscription information of a plurality of user equipment, to request notifications about changes in said user consent information, in user consent information of a group of user equipment or in user consent information of any user equipment, wherein the subscription request identifying the user equipment includes any user equipment within a range of user equipment and/or group of user equipment, wherein Consent Change is set to True, wherein based on this subscription, the database transmits notifications to the apparatus whenever consent of any user equipment, said range of user equipment or the group of user equipment is changed, wherein the optimized subscription request for a group would reduce the load of the apparatus and the database, wherein the at least one user equipment whose data is authorized by the apparatus to access belongs to this group;

receive a notification about revocation of user consent of a user equipment;

determine, responsive to receiving the notification, that the logical network entity stores data related to the user equipment; and transmit a request to delete said data related to the user equipment to the logical network entity, wherein the user equipment is one of the at least one user equipment whose data the logical network entity is authorized by the network function to access, the user equipment is in a group of user equipment whose data the logical network entity is authorized by the network function to access or the user equipment is one of any user equipment.

2. The apparatus according to claim 1, wherein the response is a success response, the success response further comprising an identity of the at least one user equipment whose data the logical network entity is authorized by the network function to access.

3. The apparatus according to claim 1, wherein the response is an error response when it is determined that the logical network entity is not authorized to access data related to any of the at least one user equipment.

* * * * *